June 26, 1973 J. M. LOMMEL 3,741,823

METHOD OF FORMING FIRST ORDER TRANSITION FILMS

Original Filed Nov. 18, 1968 3 Sheets-Sheet 1

June 26, 1973 J. M. LOMMEL 3,741,823

METHOD OF FORMING FIRST ORDER TRANSITION FILMS

Original Filed Nov. 18, 1968 3 Sheets-Sheet 3

United States Patent Office 3,741,823
Patented June 26, 1973

3,741,823
METHOD OF FORMING FIRST ORDER TRANSITION FILMS

James M. Lommel, Schenectady, N.Y., assignor to General Electric Company

Original application Nov. 18, 1968, Ser. No. 776,619, now Patent No. 3,607,460. Divided and this application Oct. 26, 1970, Ser. No. 84,176
Int. Cl. H01f *1/02*
U.S. Cl. 148—103 2 Claims

ABSTRACT OF THE DISCLOSURE

Thin films of iron-rhodium exhibiting a broadly hysteretic first order transition between the ferromagnetic and antiferromagnetic states are produced by sequentially depositing iron and rhodium films upon a refractory substrate at a pressure in the range of $1 \times 10^{-6}$ torr, annealing the structure in a vacuum of $1 \times 10^{-6}$ torr at a temperature of approximately 700° C. for 1 hour to produce a complete diffusion of the iron and rhodium layers, and subsequently subjecting the diffused layers to a second anneal in an atmosphere greater than 10 parts per million oxygen in a thermal cycle that includes slowly heating the structure to 400° C., maintaining the 400° C. for approximately 10 minutes and slowly cooling to room temperature. Films thus formed are advantageously employed in the recording of digital information by electron beam heating individual regions through a first order transition to the ferromagnetic state whereupon the regions are permitted to cool to a biasing temperature slightly higher than the temperature of transition back to an antiferromagnetic state. A magnetic field then is applied to the entire film to magnetize only those regions of the film in the ferromagnetic state and readout of the recorded information can be achieved by conventional electron beam microscopy. The ferromagnetism of the film subsequently can be erased by cooling the film below the transition temperature to the antiferromagnetic state or by the application of a strain to the film.

THE DISCLOSURE

Figure 1:
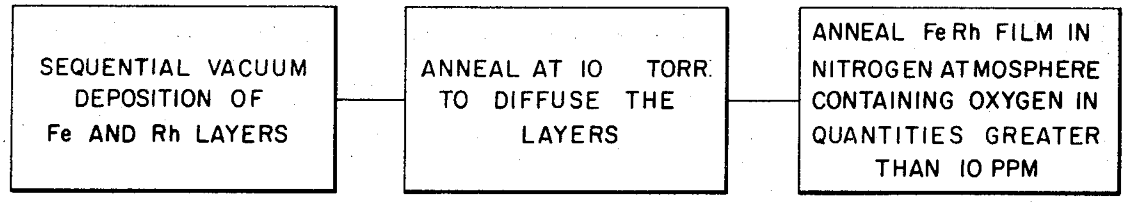

This invention relates to iron-rhodium films having a substantially complete first order transition between the magnetic and nonmagnetic states on heating and the methods of forming such films. These films are particularly useful in the recording of digital information by a unique recording scheme wherein information is stored by the conversion of individual regions to a magnetic state rather than by the relative alignment of the magnetization in selected regions of completely magnetic films. The invention described herein was made in the course of or under a contract or subcontract thereunder with the Department of the Air Force.

This application is a division of application Ser. No. 776,619, now Pat. No. 3,607,460, entitled First Order Transition Films for Magnetic and Method of Forming.

The intermetallic compound iron-rhodium has been a source of scientific curiosity because of the first order transition exhibited by the bulk material in abruptly transforming from the antiferromagnetic to the ferromagnetic states upon heating to a temperature above approximately 60° C. Films of the compound heretofore produced by conventional film forming techniques however, have been characterized by a broad thermal hysteresis (contrary to the narrow thermal hysteresis of approximately 10° C. exhibited by the well annealed bulk material) and only a partial transition to the antiferromagnetic state upon cooling. Such results have been reported in the Journal of Applied Physics, vol. 37, No. 3, 1483–1484, Mar. 1, 1966. It is a particular object of this invention to provide a thin film of iron-rhodium exhibiting a broad thermal hysteresis with a high percentage transition between the ferromagnetic and antiferromagnetic states and the method of forming of such a film.

The first order transition characteristics of the film also permit the recording of digital information by novel techniques. For example, prior to this time digital information has been recorded upon magnetic materials by an orientation of the magnetic domains at selected regions in a chosen direction. Illustrative of these prior techniques is Curie point writing, wherein information is stored by aligning the magnetization of regions selectively heated above the Curie temperature of the magnetic film and cooling the film in the presence of an aligning magnetic field. Information then can be readout utilizing the magneto-optic Kerr or Faraday effect. Similarly, in compensation point writing, heating of selected regions of a gadolium iron garnet film by a laser or electron beam decreases the coercive force of the heated regions to permit alignment of the magnetization of the heated regions utilizing an externally applied field.

It is an additional object of this invention to provide a novel digital recording technique wherein information is thermally recorded by a conversion of selected regions of a recording film between the magnetic and the nonmagnetic states in a first order transition.

A further object of this invention resides in providing a novel recording medium for the storage of digital information in accordance with the recording techniques of this invention.

It is still another object of this invention to provide a recording medium wherein the ferromagnetism can be mechanically erased.

These and other objects of this invention generally can be achieved utilizing a thin, e.g. less than 1 mil thick, iron-rhodium film having a composition range between 50–65 atom percent rhodium and characterized by a first order transition between the ferromagnetic and antiferromagnetic states in excess of 50 percent of the film when temperature cycled through the thermal hysteresis loop of the film. To provide a suitable thermal tolerance for recording, the film preferably has a thermal hysteresis loop having a width between 10° C. and 200° C. at the mean magnetization of the film.

Iron-rhodium films having these characteristics generally can be formed by positioning a conventional iron-rhodium film, e.g. a 50–65 atom percent rhodium film characterized by a thermal hysteresis in excess of 50° C. and a transition of less than 50 percent of the film between the ferromagnetic and antiferromagnetic state upon thermal cycling, in an atmosphere containing oxygen in a quantity greater than 10 parts per million and annealing the film in the partial oxygen atmosphere to increase the portion of the film undergoing transition to an amount in excess of 50 percent of the film. For a broad thermal hysteresis in the film, the oxidation anneal preferably is conducted for a period between five minutes and four hours at a temperature between 100° C. and 800° C. and the oxygen content of the atmosphere wherein the anneal is conducted is less than approximately 1000 parts per million oxygen.

Information is recorded in digital form upon the medium by selectively heating regions of the film in the nonmagnetic state to a temperature whereat a first order transition to the magnetic state is effected and applying a magnetic field to the film to magnetize the regions of the film converted to the magnetic state. Thus the digital information is stored by a unique method which comprises the recording of information of a first magnitude as a magnetic region in a film of homogeneous composition and recording information of a secnd magnitude as a juxtaposed nonmagnetic region in the film. The location of the magnetized regions of the film then can be detected by conventional readout means such as electron beam microscopy.

Figure 2:
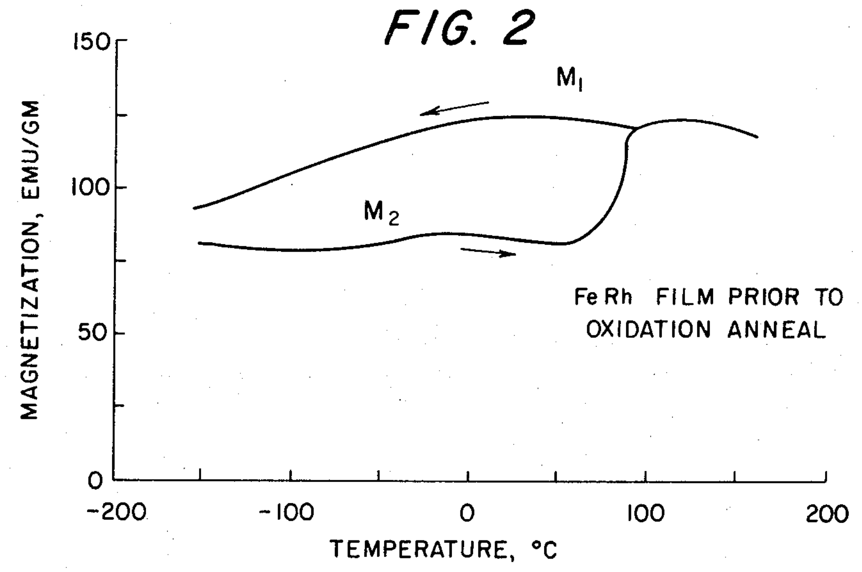
Figure 3:
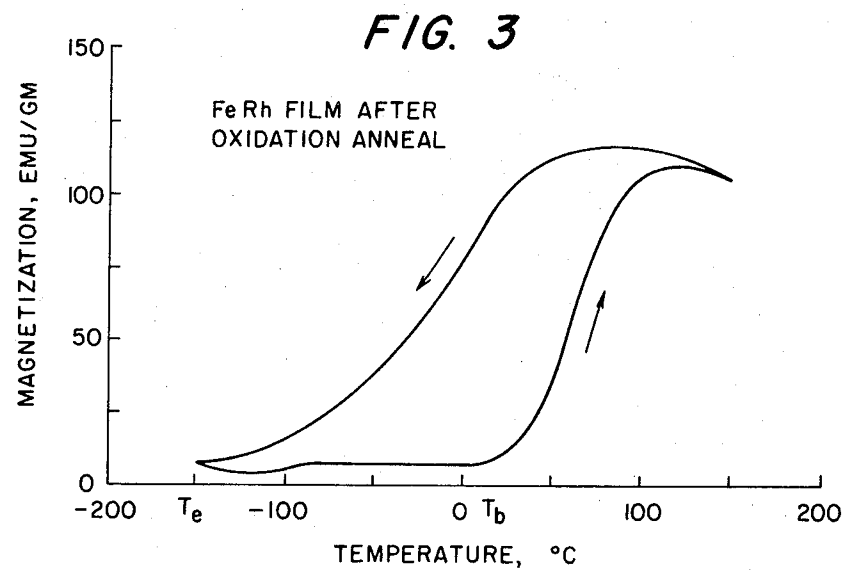
Figure 4:
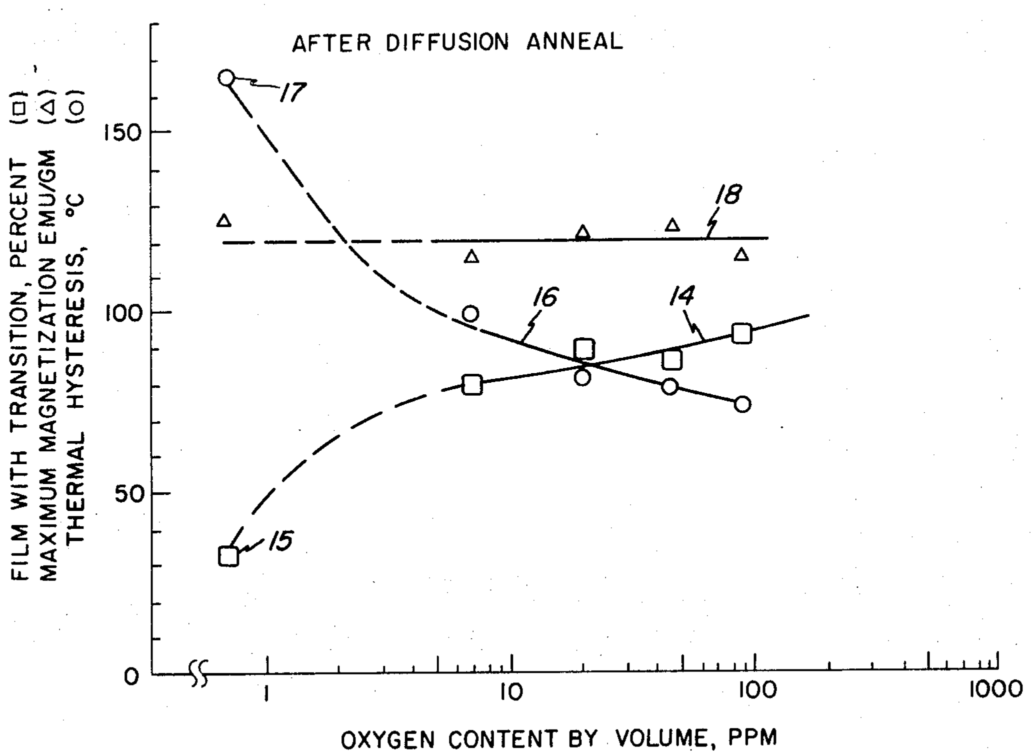

The novel features believed characteristic of the invention are set forth in the appended claims. The invention itself, together with further objects and advantages thereof may best be understood by reference to the following description, taken in connection with the accompanying drawings, in which:

FIG. 1 is a block diagram depicting a technique for the formation of first order transition iron-rhodium films in accordance with this invention, FIG. 2 is a graph depicting the variation of magnetization with temperature in an ionr-rhodium film sub-prior to an oxidation anneal, FIG. 3 is a graph depicting the variation of magnetization wtih temperature in an iron-rhodium film subsequent to an oxidation anneal in accordance with this invention, FIG. 4 is a graph depicting the variation of magnetization, hysteresis width and percent transition of an iron-rhodium film with the oxygen content of the second annealing atmosphere.

Figure 5:
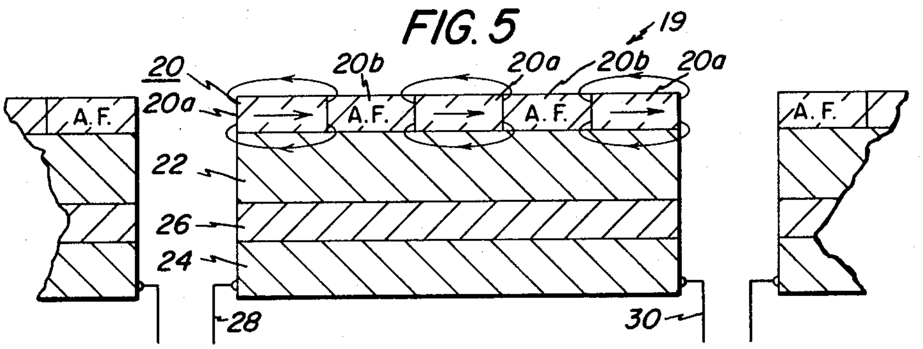
Figure 6:
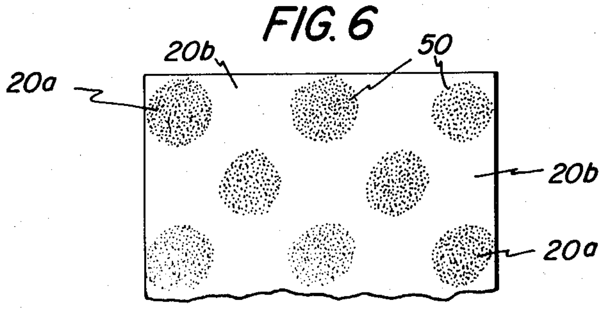
Figure 7:
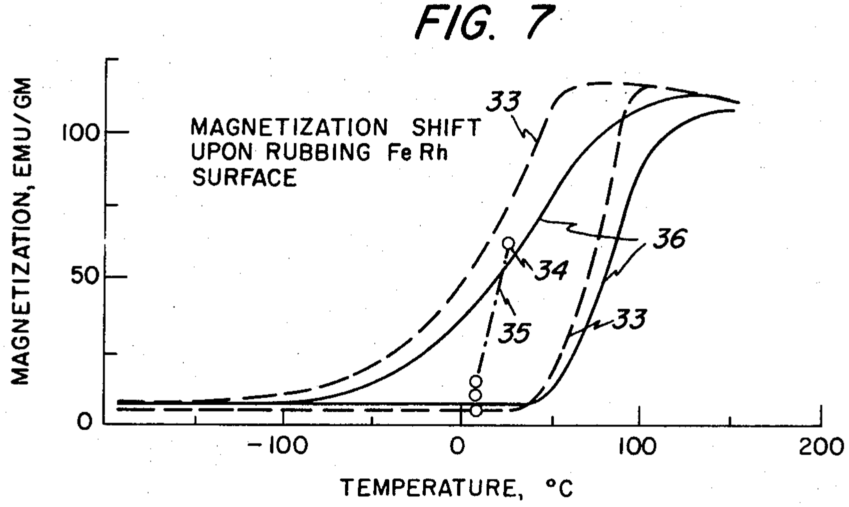
Figure 8:
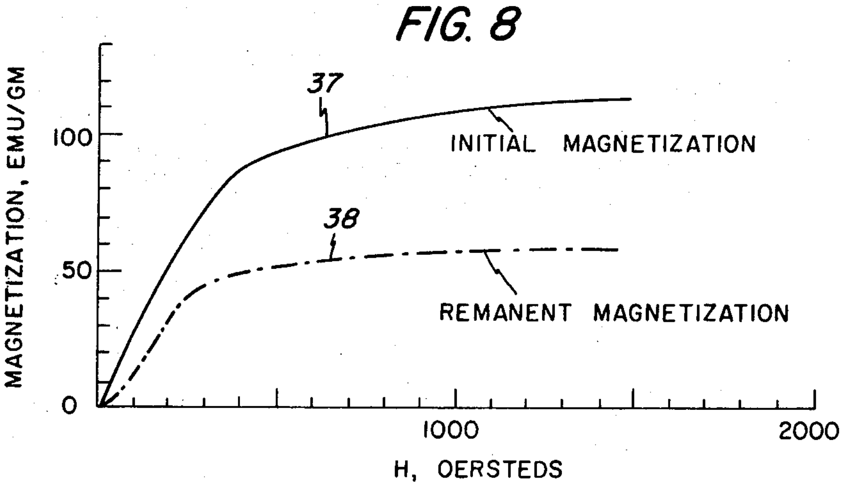
Figure 9:
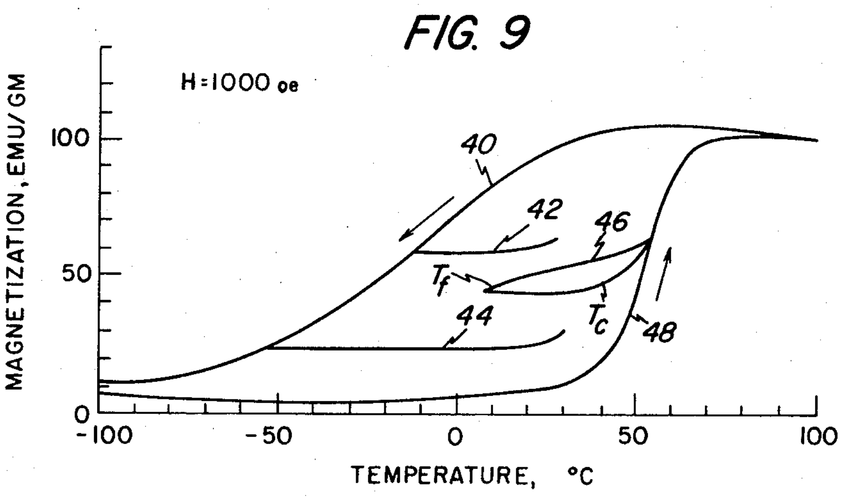

FIG. 5 is an enlarged sectional view of a digital recording medium employing the iron-rhodium film of this invention as a recording film, FIG. 6 is an enlarged pictorial illustration of one method of readout from the film, FIG. 7 is a graph illustrating the effect of stress upon an iron-rhodium film, FIG. 8 is a graph depicting the magnetic field strength required to produce a given magnetization in an iron-rhodium film formed in accordance with this invention, and FIG. 9 is a graph depicting the variation of magnetization with temperature at diverse locations along the thermal hysteresis loop of the iron-rhodium film.

A preferred method of forming an iron-rhodium film having a broadly hysteretic first order transition between the ferromagnetic and antiferromagnetic states is depicted generally in FIG. 1 and initially includes the preparation of a conventional iron-rhodium film having a broad thermal hysteresis and an incomplete transition, i.e. a minimum magnetization between one-half and three-quarters the maximum film magnetization, by sequentially vacuum depositing iron and rhodium films upon a refractory substrate and annealing the deposited films in a vacuum better than $10^{-5}$ torr at a temperature between 400° and 700° to diffuse the layers. To obtain a first order complete transition in the alloy film, a subsequent anneal of the film is conducted in a flowing nitrogen atmosphere containing oxygen in quantities greater than 10 parts per million.

The sequential vacuum deposition of the iron and rhodium films preferably is accomplished by electron beam heating iron and rhodium sources positioned upon a water cooled hearth within a vacuum chamber which is evacuated to a pressure less than approximately $10^{-5}$ torr to reduce oxidation of the films during the evaporation. Typically, the iron and rhodium are evaporated in a vacuum of approximately $10^{-6}$ torr range with the sequence of the deposition of the alternate layers not being important although preferably the iron film is deposited initially and subsequently overlayed with rhodium to inhibit oxidation of the iron during the subsequent anneal. Similarly, the number of alternately deposited layers is not of significance provided the respective thicknesses of the layers result in a 50–65 atom percent rhodium composition film when annealed to diffuse the layers. For recording purposes wherein a low remanent magnetization is desirable, a high rhodium percentage, e.g. approaching 65 atom percent, is advantageously employed.

The deposition rate employed in forming the alternate iron and rhodium layers generally is not critical with deposition rates of 4 A. per second to 25 A. per second being suitably employed for the deposition. The higher deposition rates are preferred however because of the reduced film contamination produced by the more rapid deposition. During deposition of the alternate layers upon the substrate, the substrate preferably is heated, e.g. to 300° C., to reduce the stress in the rhodium film deposited thereon and increase its adherence to the substrate. The substrate employed for the deposition of the alternate layers thereon desirably is a refractory material, e.g. fuse silica, alumina, silicon or clear sapphire, to inhibit diffusion of impurities into the film from the substrate during annealing and to withstand the elevated temperatures of the diffusion anneal, e.g. up to 700° C.

In general, the iron and rhodium sources employed in the vacuum evaporation should be of high purity although minor amounts of some impurities can be tolerated and often are beneficial to the magnetic characteristics of iron-rhodium. For example, certain materials, such as molybdenum, nickel, copper and niobium can completely destroy the transition characteristics of iron-rhodium if present in quantities in excess of 2 atom percent. Other materials, however, serve to shift the transition temperature of the iron-rhodium and can be beneficially employed to position the magnetic hysteresis curve of the alloy at a desired thermal value, i.e. less than 10 atom percent ruthenium, osmium, iridium, and platinum tend to increase the critical transition temperature of iron-rhodium while palladium, vanadium, manganese, and gold in quantities of 10 atom percent or less tend to decrease the critical transition temperature of iron-rhodium. When it is desired that one or more of these impurities be incorporated into the film, the impurity can be co-deposited with the iron or rhodium layers as an alloy or deposited as a separate alternate layer in a thickness suitable for the desired percentage of impurity in the film. The total thickness of the deposited layers however characteristically is less than one mil with typical films having thicknesses between 200 A. and 3000 A.

After deposition of the iron and rhodium films upon the substrate, the structure is annealed at a temperature between 400° and 700° C. in a vacuum below $10^{-5}$ torr for the period required to completely diffuse the layers together thereby forming the intermetallic iron-rhodium compound. The diffusion anneal preferably is conducted in a very good vacuum, e.g. $10^{-6}$ torr, to inhibit an excessive oxidation of the film deleterious to the film transition characteristics while annealing at temperatures substantially above 700° C. tends to produce island structures in the iron-rhodium film reducing the adherence of the film upon the substrate. Because a very fine island structure also can reduce lateral heat flow between juxtaposed bit sites in the writing of information into the film, the size of a bit site advantageously could be reduced by a high temperature diffusion anneal.

In general, the period of the diffusion anneal is not critical provided the evacuation chamber is of a reduced oxygen content, for example, at a vacuum of $4 \times 10^{-7}$ torr in a dynamically pumped vacuum system employing a 2-inch oil diffusion pump and a liquid nitrogen cold trap to prevent contamination of the chamber, complete diffusion of the layers and a broadly hysteretic transition in the magnetic properties of the film with temperature was obtained when the diffusion anneal was conducted at 700° C. for periods between one hour and 25 hours. When the oxygen content of the diffusion anneal chamber is increased, an excessively protracted diffusion anneal can substantially oxidize the intermetallic compound formed by the anneal thereby destroying the thermal hysteresis of the film. Annealing at 400° C. for periods as short as one hour has been found to produce films exhibiting a magnetic hysteresis upon thermal cycling and a physical structure identical to that of bulk samples of the intermetallic compound iron-rhodium when examined by X-ray diffraction.

The thermal hysteresis curve of an iron-rhodium film containing 0.56 atom fraction rhodium and formed by a diffusion anneal at 690° C. for 1 hour at a pressure of $4\times10^{-7}$ torr when temperature cycled in the presence of a 1000 oersted field is characterized by the curve of FIG. 2, i.e. less than 50 percent of the film undergoes a transition between the ferromagnetic and antiferromagnetic states with temperature cycling. The thermal hysteresis of the film is broad, being in excess of 150° C. at the mean magnetization of the film in comparison to well annealed bulk iron-rhodium which characteristically exhibits a thermal hysteresis of 10° C. or less.

The fraction of film undergoing transition between the ferromagnetic state and the antiferromagnetic state can be determined approximately from the formula, $$F=\frac{M_1-M_2}{M_1}$$

wherein

F is the fraction of film undergoing transition $M_1$ is the maximum magnetization of the film upon cooling after heating the film above the transition temperature of the film, and $M_2$ is the minimum magnetization of the film upon heating after cooling the film below the film transition temperature.

For films which transform completely to the antiferromagnetic state, the minimum magnetization ($M_2$) on heating is zero and F is equal to 1. It thus may be stated that the iron-rhodium intermetallic compound films formed by the diffusion anneal are characterized by a first order transition in which less than 50 percent of the film transforms between the ferromagnetic and antiferromagnetic states and in which the thermal hysteresis is in excess of 50° C. at the center of the magnetic thermal hysteresis loop of the film.

After annealing the layered film structure to form a homogeneous iron-rhodium film having the broadly hysteretic incomplete transition characterized by FIG. 2, the iron-rhodium film is again annealed in an atmosphere containing oxygen in quantities greater than 10 parts per million to produce a film having a substantially complete transition such as is characteristically displayed by the curve of FIG. 3. Preferably the anneal is conducted at a temperature of approximately 400° C. with the film being raised from room temperature to 400° C. in increments of approximately 6° C./min., held at 400° C. for approximately 5 minutes and cooled back to room temperature at a rate similar to the heating rate. The atmosphere employed during the anneal preferably is one atmosphere of flowing nitrogen containing oxygen in quantities between 10 parts per million and 1000 parts per million as measured by the oxygen sensor described in abandoned U.S. patent application Ser. No. 554,443, filed June 1, 1966 in the name of H. S. Spacil and assigned to the assignee of the present invention. In general, the quantity of oxygen present during the oxidation anneal is dependent upon the temperatures employed for the anneal with higher temperatures significantly reducing the quantity of oxygen required. Similarly, the oxygen content needed in the annealing chamber varies as a function of the time employed for the anneal. Annealing for periods in excess of one hour at 400° C. at a partial pressure above $10^4$ parts per million oxygen can substantially oxidize the iron-rhodium intermetallic compound thereby destroying the magnetic hysteresis of the film. The annealing desirably is conducted for periods between 5 minutes and 4 hours at temperatures of 400° C. when the oxygen content of the annealing atmosphere is between 10 and 200 parts per million. In general, the oxygen content, temperature and period of the oxidation anneal are interdependent and controlled to produce an oxidation of the iron-rhodium film sufficient to effect a transition in excess of 50 percent of the film without unduly oxidizing the film to reduce the saturation magnetization below a recordable level. Iron-rhodium films given a second anneal in one atmosphere nitrogen containing oxygen in concentrations as high as $10^4$ parts per million exhibited a nearly complete transition between the ferromagnetic and antiferromagnetic states. The thermal hysteresis loop of the film however was narrow, i.e. 10° C. at the mean magnetization, and the transition between the antiferromagnetic and ferromagnetic states was gradual with a transition in approximately 90 percent of the film requiring an increase in temperature beyond the film critical transition temperature approximately twice that required for films annealed in one atmosphere nitrogen containing less than 100 parts per million oxygen.

The effect of oxygen during the second anneal upon the magnetic properties of an iron-rhodium film given a second anneal for 10 minutes at 400° C. subsequent to a diffusion anneal at 700° C. for 1 hour in a vacuum of $5\times10^{-7}$ torr is depicted in FIG. 4. As can be noted from the percent film transition curve, identified by reference numeral 14, transition in over 80 percent of the iron-rhodium film occurred at oxygen levels slightly above 7 parts per million oxygen in one atmosphere of flowing nitrogen and the percent of film undergoing transition increased from an initial value (identified by reference numeral 15) below 40 percent to a value of 90 percent when annealed for 10 minutes at oxygen concentrations above 50 parts per million. The hysteresis width of the transition at the mean magnetization, illustrated by curve 16, decreased from an original value (identified by reference numeral 17) in excess of 160° C. prior to the second anneal to a value of approximately 80° C. when annealed in a nitrogen atmosphere containing 40 parts per million oxygen. The maximum magnetization of the iron-rhodium film (identified by reference numeral 18) remained essentially constant at approximately 120 emu/gm. notwithstanding the diverse oxygen contents of the second anneal.

In specifically forming one iron-rhodium film in accordance with this invention, a 99.9 percent electrolytic iron source and a 99.9 percent rhodium source were positioned upon a water cooled crucible in a conventional vacuum bell jar having a four-inch oil diffusion pump and an antimigration liquid nitrogen cold trap. The iron source had been annealed in dry nitrogen for one hour at 900° C. to reduce the oxygen content of the iron. The vacuum system was evacuated to approximately $8\times10^{-7}$ torr and both sources were melted separately by a 2 kw. electron gun to reduce outgassing during evaporation. The iron source then was electron beam evaporated at a pressure of $8\times10^{-6}$ torr and deposited at a rate of approximately 12 A./sec. upon a clean fused silica substrate positioned 25 cm. from the sources and heated to a temperature of 275–300° C. After deposition of the iron layer, the rhodium source was evaporated at a pressure of $4\times10^{-6}$ torr and deposited at 15 A./sec. atop the iron film upon the heated substrate to a thickness sufficient to produce a 0.54 atom fraction rhodium film upon subsequent diffusion of the layered structure. The total thickness of the films was approximately 550 A. The structure then was given a diffusion anneal at 690° C. for one hour at $8\times10^{-7}$ torr in a dynamically pumped vacuum system. After cooling the structure to room temperature, the film exhibited a microstructure having as a major component the CsCl structure phase typical of bulk FeRh samples with an f.c.c. phase with a lattice parameter about the same as elemental rhodium. The thermal hysteresis loop of the film in a 1000 oersted field is depicted in FIG. 2, and shows an incomplete transition between the antiferromagnetic and ferromagnetic states with a large thermal hysteresis at the mean magnetization of the film.

The structure then was given a second anneal in a gaseous environment of one atmosphere of flowing nitrogen containing an oxygen concentration between 80 p.p.m. and 100 p.p.m. with the rate of gaseous flow through the system being approximately 2 ft.$^3$/hr. The structure was raised from room temperature to 400° C. in approximately 5 minutes, held at 400° C. for about 10 minutes and cooled to room temperature at the same rate. The film exhibited an approximately 95 percent transition, as portrayed in the thermal hysteresis loop of FIG. 3 when temperature cycled in a 1000 oersted field, and a large thermal hysteresis of approximately 80° C. at the mean magnetization of the film. The transition was sharper upon heating, occurring within approximately 60° C., then on cooling where a temperature change of approximately 200° C. was required to return the film essentially to the antiferromagnetic state. Repeated temperature cycling of the film between 125° C. and −150° C. indicated the transition to be stable.

The thermal hysteresis loop illustrated in FIG. 3 and produced by an iron-rhodium film treated in accordance with the double anneal techniques of this invention is characterized by a first order transition from the antiferromagnetic state to the ferromagnetic state (as illustrated by a measured magnetization of approximately 115 emu/gm. in a 1000 oersted field when heated above 100° C.). Upon subsequent cooling of the film below 60° C., the measured magnetization of the film (and therefore the percentage of the film in the ferromagnetic state) remains substantially constant to a temperature of approximately 50° C. whereafter the film returns to an essentially antiferromagnetic state of 8 emu/gm. (±2-emu/gm. error in the measured film magnetization) in a first order transition. Thus approximately 95% of the film undergoes transition between the ferromagnetic and antiferromagnetic states after annealing a conventional 35% transformed film having a broad hysteresis in an atmosphere having an oxygen concentration greater than 10 parts per million oxygen. Another significant characteristic in iron-rhodium films of this invention is the broad thermal hysteresis of the film, i.e. at the mean magnetization of the film, i.e. approximately 60 emu/gm., the film is characterized by a thermal hysteresis of approximately 80° C. Although repeated cycling of the film through the thermal hysteresis loop of the film produces some slight diminishment in the thermal hysteresis, iron-rhodium films after $10^5$ thermal cycles between −195° C. and 100° C. still have been found to retain essentially the original thermal hysteresis.

The iron-rhodium film of this invention also is characterized by a rapid transition to the ferromagnetic state upon heating above the critical temperature of the film. As can be seen from FIG. 3, the magnetization of the film in a 1000 oersted field increases from a value of approximately 8 emu/gm. to a maximum value of approximately 115 emu/gm. between 20° C. and 90° C., e.g. over 90% of the film is transformed between the antiferromagnetic and ferromagnetic states within a temperature span of 70° C.

In general, the magnetic hysteresis loop of the iron-rhodium film of this invention is relatively square exhibiting a remanent magnetization to saturation magnetization ratio of approximately 0.7. A sample 550 A. thick iron-rhodium film given a double anneal treatment in accordance with this invention had a coercive force of approximately 160 oersteds.

Transmission electromicrographs were taken of iron-rhodium films formed under identical conditions except for the oxidation anneal. One film was annealed in vacuum and produced an incomplete transition characterized by the hysteresis curve of FIG. 2 while the second film was annealed in a flowing nitrogen atmosphere containing oxygen in concentrations between 10 and 200 parts per million and produced a complete transition characterized by the hysteresis curve of FIG. 3. Most aspects of the microstructure, e.g. grain size, stacking faults, twins, etc., were qualitatively identical although the film with the complete transition showed a much more mottled structure within the grains than did the film having the incomplete transition. Electron beam microscopic examination indicates that the mottling arises from a discrete array of particles very regularly arranged in a two dimensional square network. The network appears to be uniform within a grain and has a periodicity of approximately 100 A. It may be postulated that the "dirty" appearance is a fine dispersion of an oxide phase.

The films of this invention are particularly adapted for utilization as a digital information recording medium 19 such as is shown in FIG. 5 wherein an iron-rhodium film 20 less than 1 mil thick and having a transition characteristic similar to that illustrated in FIG. 3 is situated atop a thermally conductive substrate 22 of a material such as silicon or quartz. The substrate is secured to a thermoelectric base 24, e.g. bismuth telluride, lead telluride, antimony telluride, silver indium telluride, copper gallium telluride, etc. by a suitable adhesive, e.g. solder layer 26, to permit temperature cycling of the iron-rhodium film by the thermoelectric base through substrate 22 upon electrical energization of the thermoelectric base from a D.C. source (not shown) through leads 28 and 30. Because iron-rhodium film 20 is thermally switched between the ferromagnetic and antiferromagnetic states in a first order transition producing a variation in film volume, adjacent recording media 19A and 19B forming a memory unit are spaced by a suitable span, e.g. 2 percent of the film dimension, to permit nondestructive thermal expansion. When the dimensions of the recording medium are sufficiently small however, the memory unit desirably is formed as a unitary structure to avoid isolation of information storage sites.

To record information in selected sites of one mil diameter or less along the iron-rhodium film, thermoelectric layer 24 initially is energized with D.C. current in a first direction to cool the structure below the temperature, $T_e$ or approximately −150° C. in the hysteresis loop of FIG. 3, at which the film becomes essentially antiferromagnetic thereby erasing any residual magnetism in the film. Electrical energization of thermoelectric base 24 then is terminated to permit the temperature of the iron-rhodium film to increase to a biasing level, $T_b$ or approximately 20° C., whereat the film remains in an antiferromagnetic state below the critical temperature producing a first order transition of the iron-rhodium film to a ferromagnetic state. An electron beam from an addressable electron gun, such as is described in U.S. Patent application Ser. No. 671,353, filed Sept. 28, 1967 now Pat. No. 3,491,236, in the name of Sterling Newberry and assigned to the assignee of the present invention, then is irradiated upon selected bit sites 20A of the iron-rhodium film to heat the irradiated bit sites above the transition temperature of the film, e.g. above 120° C., and the irradiated bit sites are transformed to the ferromagnetic state in a first order transition. Upon removal of the electron beam, the irradiated bit sites, i.e. 20A, cool to the biasing temperature, $T_b$. After the application of a sufficiently large magnetic field for a short time, e.g. a pulsed field greater than 300 oersteads, the irradiated bit sites possess a ferromagnetism indicative of information of a first magnitude. Those bit sites 20B not irradiated during recording remain in the antiferromagnetic state thereby storing digital information of a differing magnitude. Thus, the selectively recorded iron-rhodium film is of homogeneous composition and characterized by a plurality of bit sites in either a magnetic or a non-magnetic state dependent upon the magnitude of information recorded at the individual bit sites. In general, an 8 kv., $2\times10^{-7}$ ampere electron beam irradiation of a 10 micron diameter region of an iron-rhodium film for 4 milliseconds has been found adequate to convert the irradiated bit sites from the antiferromagnetic state to the ferromagnetic state. Adjacent bit sites were not raised above the critical transition temperature and remained essentially antiferromagnetic.

Readout of the recorded information from the iron-rhodium is achieved by the application of a pulsed magnetic field in excess of 300 oersteds to the film to align the domains in ferromagnetic bit sites 20A thereby producing a film characterized by ferromagnetic bits with a magnetization in a given direction interspaced with essentially antiferromagnetic bit sites 20B having zero net measurable magnetization. Because detection of the alignment direction of the individual bit sites is not required, visual readout can be easily effected by coating the iron-rhodium film with a colloidal solution of iron oxide particles (or Bitter solution) which particles drift to the magnetized bit sites in the recording medium. Thus a plurality of observable dark areas, e.g. spots 50 shown in FIG. 6, are produced at the electron beam irradiated ferromagnetic bit sites with the drift of iron particles from the essentially antiferromagnetic bit sites 20B resulting in a relatively clear liquid coating at such sites. When extremely high speed is desired for readout, other conventional methods of magnetic detection, e.g. electron beam microscopy, can be employed to locate the magnetized bit sites. To erase the recorded information, thermoelectric base 24 is again energized to reduce the temperature of iron-rhodium film 20 to $T_e$ whereupon the entire film returns to the antiferromagnetic state and the previously recorded information is erased.

Erasure of the recorded information from the iron-rhodium film also can be effected mechanically by the application of a strain to the film thereby returning the strained portion of the film to essentially the antiferromagnetic state, as is depicted by the curves of FIG. 7. The thermal hysteresis curve was obtained by temperature cycling a doubly annealed iron-rhodium film along hysteresis loop 33 to 140° C. to transform the film to the ferromagnetic state and subsequently cooling the film to approximately 15° C. whereupon the magnetization of the film returned along the hysteresis loop to a value of approximately 66 emu/gm. (identified by reference numeral 34). The film then was hand rubbed with a cotton swab for less than 20 traversals and the magnetization decreased (as shown by dotted line 35) to a value of approximately 9 emu/gm. with a variation of only 5° C. in the temperature of the iron-rhodium film. Continued rubbing of the iron-rhodium film with the cotton swab reduced the measured magnetization of the film at 10° C. to less than 5 emu/gm. and the low magnetization state obtained by the rubbing induced strain remained stable as the film was cooled to a temperature below −180° C. Upon subsequent heating the film to 140° C. however, the ferromagnetic characteristic of the film returned as exemplified by solid hysteresis loop 36, although the thermal hysteresis curve is somewhat narrowed by the effects of the strain upon the film. In general, the quantity of strain applied to the iron-rhodium film to effect an erasure of the recorded information should be greater than 0.3 percent but not so great as to cause the body centered cubic structure to transform to the paramagnetic face centered cubic structure.

Desirably, a small quantity of palladium is added to the iron-rhodium film to shift the critical temperature of the film to the magnetic state to approximately 30° C., e.g. 5° C. above room temperature, to reduce the electron beam power required to transform bit sites to the ferromagnetic state while retaining the nonvolatile characteristics of the medium. Similarly cooling apparatus, such as thermoelectric base 24, can be omitted when sufficient iridium or platinum is introduced into the iron-rhodium film to shift the hysteresis loop by an amount positioning $T_e$ at 25° C. The film then can be raised to the biasing temperature $T_b$ at the threshold of the critical film transition temperature by current through the film or by electron beam impingement upon the entire film plane. Information is recorded at selected bit sites by heating with a second electron beam to increase the temperature of the irradiated sites above the critical transition temperature of the film thereby converting the irradiated sites to the ferromagnetic state. Similarly, other conventional heat sources, e.g. visible or infrared light, can be employed to raise an iron-rhodium-iridium film to the biasing temperature of the film.

Although alignment of the magnetic domains within the ferromagnetic bit sites of iron-rhodium film 20 has been described as being produced by the application of a magnetic field to the film after the selectively heated film has been cooled to a biasing temperature, $T_b$, the magnetic field also can be applied to the film simultaneously with the selective heating of the film. In such event, selective heating of the film bit sites utilizing a laser beam is preferred to inhibit undesired deflection of the beam by the field magnetizing the bit sites converted to the ferromagnetic state. Thus, to write information, the film is cooled to a temperature $T_e$ whereat the entire film is converted to the antiferromagnetic state and the entire film is thereupon heated to a biasing temperature $T_b$ at the threshold of a first order transition to the ferromagnetic state. A laser beam then is selectively impinged upon individual bit sites of the film to raise the bit sites above the transition temperature converting the bit sites to the ferromagnetic state in a first order transition. Upon removal of the writing laser beam from each irradiated bit site, the irradiated sites return to the biasing temperature along the thermal hysteresis loop and remain in a ferromagnetic state relative to the unheated bit sites.

The magnitude of the magnetic field required to magnetize a ferromagnetic, but demagnetized, iron-rhodium film is depicted by the curves of FIG. 8 wherein curves 37 and 38 represent the saturation magnetization and remanent magnetization of the film, respectively. As can be seen from curve 37, an applied field of 800 oersteds is required for a ferromagnetic iron-rhodium film at room temperature to reach 0.9 of the maximum saturation magnetization of the film. Upon termination of the applied magnetic field to the film, the magnetism of the film decreases to a remanent value, identified by curve 38 of FIG. 8, approximately 60 emu/gm. below the saturation magnetization obtainable with the given field.

Another advantageous attribute of iron-rhodium films in accordance with this invention is the adjustable saturation flux density of the film as can be observed from FIG. 9 wherein a major thermal hysteresis loop 40 of an iron-rhodium film in a 1000 oersted field is depicted. Thus, if the iron-rhodium film upon temperature cycling is cooled only partially in the return cycle, e.g. interrupted at −10° C. along hysteresis loop 40, and then reheated, the saturation magnetization of the film, as depicted by curve 42 remains substantially constant at 60 emu/gm. over a temperature span between −10° C. and 30° C. When the cooling cycle of the major hysteresis loop is interrupted at a more reduced temperature, e.g. −58° C., a constant saturation magnetization of 23 emu/gm., as portrayed by curve 44, is maintained when the temperature of the film is cycled between −58° C. and +30° C. In general, the allowable temperature excursion permissable without change in film magnetization is somewhat less than the thermal span between the temperature at which the cooling cycle of the film is interrupted and the critical transition temperature of the film to the ferromagnetic state, curve 48. Thus the magnetization of the iron-rhodium film (indicative of the saturation flux density of the film) can be adjusted merely by an interruption of the cooling cycle of the film at a desired thermal location subsequent to the transition of the film to the ferromagnetic state. Similarly, alterations in the saturation flux density of the iron-rhodium film can be effected during the heating cycle of the major hysteresis loop by interrupting the heating cycle prior to the maximum magnetization of the film, e.g. at 55° C., and cooling the film along minor hysteresis loop 46 to a temperature, $T_F$, producing the desired flux density, as indicated by the measured magnetization of the film in the 1000 oersted field. Subsequent reheating and cooling of the film within a temperature span between $T_F$ and the critical transition temperature $T_C$ of the minor hysteresis loop produces a negligible variation in the saturation flux density from the present value. Thus the flux of the iron-rhodium film can be adjusted to a desired value merely by an alteration in the thermal cycling of the film.

The iron-rhodium film of this invention also can be suitably employed as a temperature sensor to indicate the maximum excursions at the termination of a temperature cycle. For example, when a material is cooled from a temperature above 150° C., the magnetization of an iron-rhodium film contacting the material is indicative of the minimum temperature reached during the cooling cycle notwithstanding a slight increase in iron-rhodium film temperature upon removal from contact with the material. Because the thermal sensitivity of the iron-rhodium film is dependent upon the disposition of the thermal hysteresis loop of the film relative to the abscissa, the slope of the iron-rhodium hysteresis curve preferably is angularly disposed relative to the temperature scale over the temperature range of interest. To obtain measurements over a broad temperature range, the oxidation anneal preferably is conducted at the upper limits of the allowed oxygen concentration to reduce the squareness of the thermal hysteresis loop while highly precise temperature measurements over a narrow range best is effected by a relatively square thermal hysteresis loop exhibiting a rapid change in magnetization over the temperature range of interest.

Although the method of recording employing the first order transition of film bit sites between the magnetic and nonmagnetic states has been described herein by specific reference to iron-rhodium alloy films, any material characterized by a first order transition from the magnetic to the nonmagnetic states with an associated thermal hysteresis, e.g. manganese bismuth, manganese arsenide or chromium manganese antimonide, also can be employed for recording in acordance with the techniques of this invention. The technique of this invention however is to be distinguished from the use of manganese bismuth in conventional Curie point writing because of the reliance of the herewith disclosed writing technique on the thermal hysteresis loop of the material, e.g. with a biasing temperature along the thermal hysteresis loop, while "Curie Point Writing" with manganese bismuth ignores the thermal hysteresis of the manganese bismuth and temperature cycles completely through the thermal hysteresis loop. Curie point writing with manganese bismuth then records information by the alignment of the magnetization at the various bit sites.

What I claim as new and desire to secure by Letters Patent of the United States is:

1. The method of forming an iron-rhodium film exhibiting a first order transition between the ferromagnetic and anti-ferromagnetic states in excess of 50 percent when cycled through the thermal hysteresis loop of the film comprising the steps of:

positioning an iron-rhodium film, having a composition of 50–65 atom percent rhodium and a thickness of from 200–10,000 A., in an atmosphere containing more than 10 and less than $10^3$ parts per million oxygen in one atmosphere of flowing nitrogen; and annealing said film in said atmosphere for from 5 to 240 minutes at a temperature between 100° C. and 800° C.

2. The method as set forth in claim 1 wherein said film comprises about 54 atom percent rhodium and has a thickness of approximately 550 A., said atmosphere contains 80–100 parts per million oxygen, and said annealing takes place for approximately 10 minutes at 400° C.

References Cited

UNITED STATES PATENTS

| | | | |
|---|---|---|---|
| 3,117,896 | 1/1964 | Chu et al. | 148—108 |
| 3,140,941 | 7/1964 | Walter | 75—172 |
| 3,140,942 | 7/1964 | Walter | 75—172 |
| 3,144,325 | 8/1964 | Walter | 75—172 |
| 3,607,460 | 9/1971 | Lommel | 148—31.55 |

OTHER REFERENCES

Morrison, R. D., et al.: Magnetic Properties of Layered Fe-Ni Films, in Journ. Appl. Phys., 37, March 1966, pp. 1476–7.

Lommel, J. M.: Magnetic and Electrical Properties of FeRh Thin Films, in Journ. Appl. Phys., 37, March 1966, pp. 1483–4.

L. DEWAYNE RUTLEDGE, Primary Examiner
W. R. SATTERFIELD, Assistant Examiner

U.S. Cl. X.R.

75—172; 148—31.55, 121